US006777012B2

(12) United States Patent
Olson et al.

(10) Patent No.: US 6,777,012 B2
(45) Date of Patent: Aug. 17, 2004

(54) SEAFOOD PRESERVATION PROCESS

(76) Inventors: Blane E. Olson, 715 Glen Forest Rd., NE, Atlanta, GA (US) 30328; Douglas B. Brinsmade, 1245 Spalding Dr., Atlanta, GA (US) 30350

(*) Notice: Subject to any disclaimer, the term of this patent is extended or adjusted under 35 U.S.C. 154(b) by 488 days.

(21) Appl. No.: 09/874,885

(22) Filed: Jun. 5, 2001

(65) Prior Publication Data

US 2002/0054942 A1 May 9, 2002

Related U.S. Application Data

(60) Provisional application No. 60/241,920, filed on Oct. 20, 2000, now abandoned.

(51) Int. Cl.$^7$ .......................... A23B 4/048; A23B 4/06; A23B 4/09
(52) U.S. Cl. ...................... 426/264; 426/265; 426/262; 426/263; 426/315; 426/320; 426/326; 426/332; 426/393; 426/643; 426/316
(58) Field of Search ................... 426/315, 263, 426/264, 265, 316, 312, 314, 320, 332, 262, 326, 393, 643

(56) References Cited

U.S. PATENT DOCUMENTS

| 2,120,237 A | | 6/1938 | Brenner et al. | |
|---|---|---|---|---|
| 3,859,450 A | | 1/1975 | Alsina ...................... | 426/268 |
| 4,522,835 A | | 6/1985 | Woodruff et al. ........... | 426/264 |
| 4,552,766 A | * | 11/1985 | Ducharme .................. | 426/332 |
| 4,753,809 A | * | 6/1988 | Webb ......................... | 426/315 |
| 5,368,872 A | * | 11/1994 | Davis ........................ | 426/315 |
| 5,484,619 A | * | 1/1996 | Yamaoka et al. ........... | 426/315 |
| 5,540,942 A | | 7/1996 | Tokoro ...................... | 426/265 |
| 5,783,242 A | | 7/1998 | Teague ...................... | 426/320 |
| 5,972,401 A | * | 10/1999 | Kowalski ................... | 426/315 |

FOREIGN PATENT DOCUMENTS

DE          3043489     * 11/1980

OTHER PUBLICATIONS

Sb. Tr. Leningr. Tekhnol. In–t Kholodil 'n. Prom–sti; No. 3, Kolodyaznaya, V. S. et al., "Effect of Ozone on Oxidative Processes Occuring During Storage of Semi–Smoked Sausage" Item 1. File 399, 1975.*
Annual Reports of the Food Research Institute Aichi Prefecture No. 27, 39–50, Naito Preservation of Smoked Cuttlefish by 03 Treatment Item 2, File 51, 1986.*

* cited by examiner

*Primary Examiner*—Steve Weinstein
(74) *Attorney, Agent, or Firm*—Thomas, Kayden, Horstemeyer & Risley

(57) ABSTRACT

The preservation of meat products is accomplished utilizing a combination of smoke, ozone and freezing preservation techniques. Particularly, fish products are sized into portions that are first treated with smoke, followed by treatment with ozone and then optionally frozen. The preservation system extends the shelf life of the fish products and permits the fish to maintain its freshness and freedom from bacterial decomposition for a longer period of time following catch. The preservation process further maintains the characteristics of day caught fish, such as taste, texture and color, making the refreshed fish products produced by the present system more appealing to consumers.

37 Claims, 5 Drawing Sheets

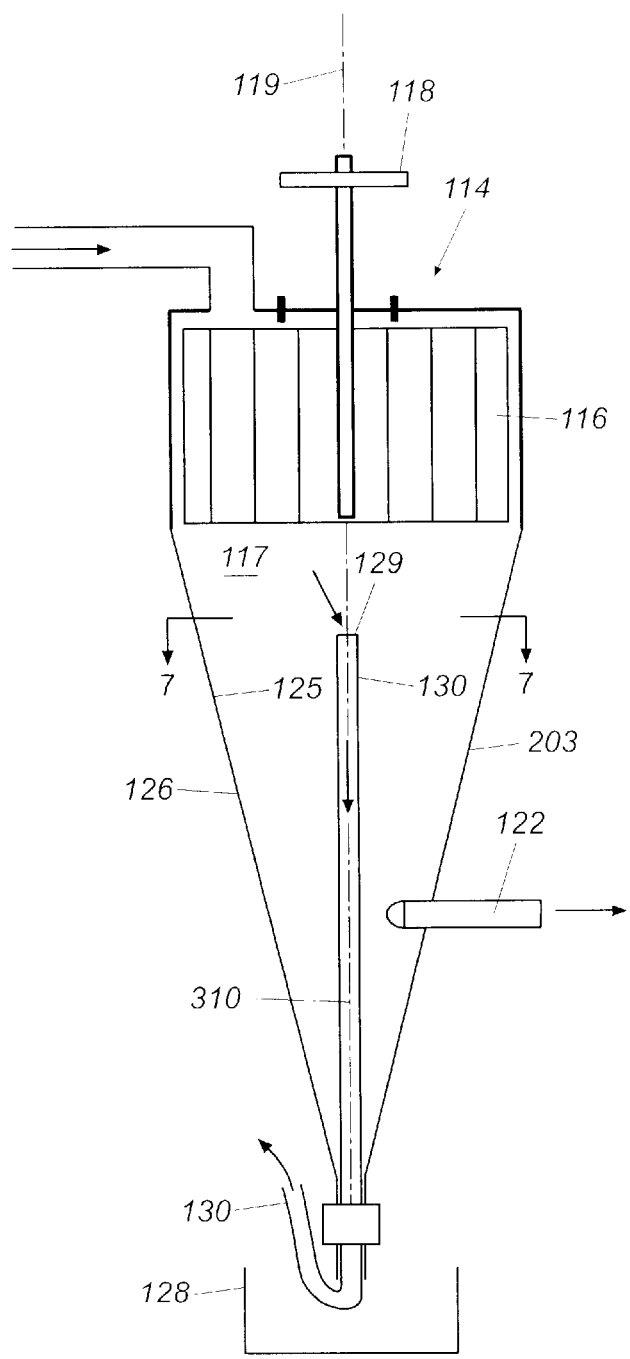
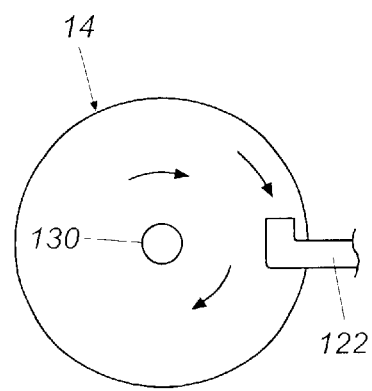
Fig. 6
Fig. 7

SEAFOOD PRESERVATION PROCESS

CROSS REFERENCE TO RELATED APPLICATION

This application claims priority to U.S. provisional application entitled, "Seafood Preservation Process," having Ser. No. 60/241,920, filed Oct. 20, 2000 now abandoned, which is entirely incorporated herein by reference.

TECHNICAL FIELD

The present invention is generally related to the preservation of seafood and other food products for consumer consumption, and more particularly is related to a process for preserving fish by treating fish with smoke and ozone to retard degradation of the fish and maintain the fresh-like appearance of the fish. Optionally, the fish can then be frozen to further prolong its shelf life

BACKGROUND OF THE INVENTION

The preservation of fish has been a major concern for fishermen and fish processors for centuries. Originally man salted and dried fish to preserve it. Since the advent of mechanical refrigeration, the fish have been preserved by freezing and refrigeration, thus permitting fishermen to make longer fishing trips, as well as transport the fish long distances over land or water.

The length of time over which fish maintains its freshness is commonly referred to as its shelf life. The shelf life of fish is determined by a number of factors, including the total number of each type of bacteria initially present, the specific types of bacteria present, the temperature of the flesh of the fish and of the surrounding atmosphere, and the pH of the fish. It is known that to extend the shelf life of fish, one may, for example, reduce the number of bacteria present using chemical means, freezing or other methods, create an acidic pH and/or maintain the product below 5° C. in its fresh state. The most common process employed to extend the shelf life of fish is freezing.

An inherent problem with freezing fish is its loss of the "fresh" attributes such as a "pink" or "red" meat color to both the fish flesh and the "blood line" in the fish. The loss of these attributes causes the value of the frozen fish to be much less than the value of fish that has not been previously frozen. This loss of value is an interpretation of the quality of the fish by the consumer. The color of the flesh and blood line of the fish is a major factor in the selling of seafood at the consumer level. Most consumers purchase fish with their "eyes" rather than with any other factor, such as smell, taste or texture. Therefore, it is desirable to maintain the "fresh" pink/red color of the seafood products as long as possible in order to sell the product at a premium to consumers.

Although many factors may effect changes to the color of fish products, the main reduction of color results from damage to the hemoglobin pigments in the fish. Several of the primary causes for the reduction of hemoglobin pigments, resulting in a corresponding reduction in the "fresh" color of the fish, include oxidation of the "red" hemoglobin pigments in the flesh to a "brown" color; bacterial decomposition of the cells containing the hemoglobin pigments; and destruction and oxidation of the hemoglobin pigment during freezing.

Most unfrozen fish is considered "fresh" for as many as 30 days from catching. However, unfrozen fish this old usually contains high levels of dangerous bacterial decomposition. Bacterial decomposition of fish is the cellular breakdown of the flesh of the fish due to the digestive enzymes of bacteria present on or within the flesh of the fish. Conversely, frozen fish is usually frozen upon catching which reduces the likelihood that the fish will contain significant or harmful levels of bacterial decomposition.

In order to preserve the freshness of the fish and maintain the color of the flesh and blood line to a satisfactory consumer level, processes using smoking and freezing techniques have been applied.

Smoking of fish has been one of the major forms of fish preservation for centuries. Smoking involves the burning of organic substances, such as wood, to produce a complex mix of over 400 separate chemical compounds. These compounds, when continually exposed to fish flesh, are absorbed into the meat over time and impart a smoke flavor to the flesh. The smoke compounds act as a natural "bacteriostat" and greatly increase the refrigerated shelf life of the flesh (up to three times the un-smoked shelf life). Smoking of fish increases the shelf life by killing a majority of the bacteria initially present, and then creating an acidic environment that slows the growth of bacteria over time in refrigerated conditions. The compounds in the smoke that are primarily responsible for the extension of the shelf life of fish are the aldehydes and phenols, as well as CO, $CO_2$, NO, $NO_2$, which are the main gaseous components of smoke. These compounds maintain the "fresh" color of the fish, as well as prevent the growth of bacteria both on the surface of the fish and within the flesh.

However, one of the problems inherent in smoking fish products to impart preservation properties is that the smoke odor and/or smoke taste remains present in the fish flesh. Additionally, smoke that is produced from organic fuel materials typically contains particulates, such as creosote, tar, soot, etc., which are undesirable elements to have in contact with the fish product. Thus, it is beneficial to provide a smoke that has had some of the particulate removed and further remove the smoke odor/taste while still maintaining the extended shelf life.

U.S. Pat. No. 5,972,401 to Kowalski discloses a process for manufacturing a tasteless, super-purified smoke for the treatment of seafood and meat. The super-purified smoke is then applied to seafood or meat to preserve the freshness, color, texture, and natural flavor, particularly after the seafood or meat is frozen and thawed. Kowalski teaches that the smoke must be super-purified by filtering out a substantial amount of odor and taste imparting particulate matter and gaseous vapors, thereby recovering the smoke in a tasteless form. Thus, Kowalski is limited in that it requires that the smoke be super-purified into a tasteless form in order to prevent the impartation of the smoke odor or taste to the seafood or meat products.

U.S. Pat. No. 5,484,619 to Yamaoka discloses a process for smoking fish and meat at low temperatures, thereby conferring a smoked flavor and taste, and further preventing decomposition and discoloration of the fish or meat. As in Kowalski, the smoke is filtered to remove the larger particulates and provide a smoke that will preserve, sterilize and aid in maintaining the color of the flesh of the fish or meat. However, Yamaoka teaches that the smoke odor or taste will remain in the fish or meat and that the temperature of application of the smoke is important. Specifically, the Yamaoka smoke preservation process must be carried out at extremely low temperatures (between 0 and 5° C.) in order to maintain the freshness and quality of the fish or meat products Therefore, Yamaoka is limited to a smoke process for preserving fish or meat products wherein the product will retain a smoke odor or taste, and the process is further limited to a narrow range of temperature conditions.

U.S. Pat. No. 2,120,237 to Brenner et al. discloses a method for partially drying and then smoking fish fillets to preserve them. The fish fillets were first dried to remove a substantial portion of the moisture present and then treated within a smoke atmosphere. This method imparted a smoke flavor to the dried fillets and aided in the prevention of the fish deterioration.

It is also known to preserve the freshness or color of fish or other meat products by several other methods of treatment. U.S. Pat. No. 3,859,450 to Alsina teaches that melanosis (blackening) in shellfish is prevented by application of an innocuous acid solution followed by carbon dioxide gas. The resultant chemical reaction between the acid solution and the carbon dioxide produces carbonic anhydride that penetrates the shellfish and prevents melanosis during preservation by freezing. The process also discloses that the use of a food preservative, such as metabisulphite, will prolong the preservation of the original taste and texture of the shellfish after thawing.

U.S. Pat. No. 4,522,835 to Woodruff et al. discloses a process for maintaining good color in meat, poultry and fish products. Specifically, Woodruff teaches that subjecting the product to an atmosphere containing a low oxygen concentration and followed by an atmosphere containing a small amount of carbon monoxide will convert oxymyoglobin to carboxymyoglobin. The process produces a red color in the product and permits lengthy refrigeration of the product (two to three weeks). Further preservation is accomplished by Woodruff by maintaining the product in a modified carbon dioxide atmosphere or by freezing.

U.S. Pat. No. 5,540,942 to Tokoro teaches that the freshness of meat or fish may be improved by treatment with ubidecarenone to prevent discoloration of the product. The ubidecarenone additive prevents the oxidation of the haem pigments, thereby maintaining the red color of "fresh" product by preventing discoloration to a brown or gray appearance.

Ozone, a GRAS (generally regarded as safe) substance, has been used for more than ten years to sanitize, deodorize and prevent bacterial growth in food items. Its main strength is in the killing of surface and subsurface bacteria that lead to decomposition of fish flesh during refrigerated storage. Ozone may be applied using a gaseous or liquid medium or a combination thereof.

U.S. Pat. No. 5,783,242 to Teague discloses a process of treating poultry with ozone and ozone dissolved in water to reduce the population of contaminating organisms. The product is first subjected to a solution containing ozone and then exposed to a gaseous atmosphere containing ozone. The product is also subjected intermittently to UV exposure which further acts as a bactericide and decomposes any ozone remaining on the product into oxygen.

Although, it is known that the foregoing techniques may be used to preserve the fish flesh itself, these techniques often result in an appearance of fish that has lost its "fresh" attributes. Accordingly, without the 'pink' or 'red' color of the fish flesh, consumers often consider such preserved fish as "not fresh," resulting in a lower sales price for the fish. The foregoing techniques claim to maintain the color of the fish do so with the addition of chemical additives and preservatives which can alter the taste and texture of the fish or be toxic in certain dosages to humans. Additionally, maintaining the "fresh" attributes of the fish is not taught when the fish is preserved or further preserved by freezing.

Therefore, a heretofore unaddressed need exists in the industry to satisfy the aforementioned deficiencies and inadequacies and provide a preserved fish that retains all of the qualities and characteristics of a "day caught" fish.

SUMMARY OF THE INVENTION

Through research and product development, the inventors have devised a process for fish preservation that results in the production of an extremely high quality, fresh seafood product line with extended shelf life characteristics. The fish products are preserved using smoke and ozone so as to maintain the qualities and characteristics of freshly caught fish.

The process allows the transportation of fresh and frozen seafood items from remote areas of the world in a safe, sanitary and economical way. However, Applicants' preservation process has overcome the drawbacks of typical freezing techniques and allows the consumer to receive a high quality, extremely safe fish with the taste, texture and attributes of freshly caught fish. The fish appears "fresh" to consumers as it retains its red, or bright, color and is, thus, more appealing.

In general, the process includes the steps of smoking of fresh fish, treating it with ozone and optionally freezing the fish. When a smoke and ozone process is utilized, the shelf life is extended and the fish retains more of its "fresh" color. The smoke/ozone process retains the "fresh" color and extends shelf life of the fish flesh by binding the carbon monoxide molecule to the heam pigment in the hemoglobin molecule in such a way that it takes much greater than normal oxidative force to oxidize the hemoglobin molecule. Furthermore, the smoke/ozone process aids in the prevention of bacterial decomposition and maintains the hemoglobin molecule (red color) during freezing and frozen storage by binding it with a CO molecule.

Optionally, the smoke/ozone process can include the steps of wiping the flesh of the fish with alcohol one to three times during the preservation process, before or after smoking the fish. The application of alcohol to the exterior of the fish kills surface and shallow bacteria on contact with the alcohol. The fish would be placed in a modified "smoke" atmosphere for 1 to 72 hours, with the length of time depending on the thickness of the fish product, with thicker products requiring more time than thinner products. If the smoke is applied to the fish while in a vacuum chamber, the time required for the smoke application can be reduced to less than a minute. During the smoking step, a vast majority of "aerobic" bacteria die as there is no oxygen available for them to breathe. The smoking step additionally creates an acidic pH in the fish by the dissolution of free carbon dioxide, present in the smoke, into the fish. The acidic pH prevents the growth of bacteria during the "fresh" stages of the process. An optional final step can involve freezing the product to kill an additional percentage of the bacteria present on the product The fish product can be initially prepared into appropriately sized sections or fillets in order to accelerate the smoke/ozone application steps.

With the use of this fish preservation process, the shelf life of the product is increased, usually from about 2–3 days after the product is landed to about 10–12 days. This increase in shelf life after the product has been treated allows the product to be shipped to remote areas requiring longer shipping times. Also, the final processing of the product into consumer-ready forms, including cutting, portioning and packing the product, can be performed at the central processing facility. This avoids the necessity of having to perform the final processing of the product at the store level.

Other processes, systems, methods, features and advantages of the present invention will be or will become apparent to one with skill in the art upon examination of the following drawings and detailed description. It is intended that all such additional processes, systems, methods, features and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a side elevational view of the centrifuge used in the smoke machine.

FIG. 7 is a cross section of the centrifuge, taken along lines 7—7 of FIG. 6.

DETAILED DESCRIPTION OF THE PREFERRED EMBODIMENT

The inventors have devised a process for preserving seafood products and other meat products of various types. Typically, the first step of the process involves the initial preparation of the fish product into appropriately sized sections 101. The skin and bones may either be removed or may be left on. As shown in FIG. 6, if the fish is of the pelagic species, such as salmon or tuna, the fish can be cut into loin portions or steaks 102. If any loin portion has a thickness that is too big for expedient smoke and/or ozone treatment, the loins can be cut into steaks.

Figure 1:
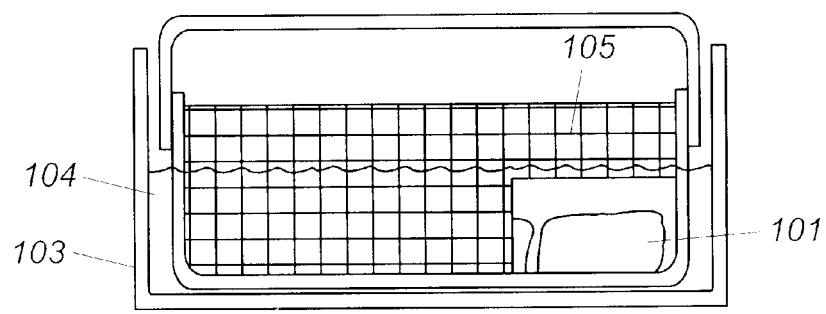
FIG. 1 is a cross sectional view of an open top liquid container with a basket of fish products immersed in a brine.

As shown in FIG. 1, the sized fish product 101 is placed in a single layer in a basket 105 or porous tray, preferably plastic, and the basket with the fish is immersed into an aqueous solution 104 of salt and baking soda in a container 103. The container 103 for the aqueous solution should have sufficient dimensions such that the fish products 101 are maintained in a single layer and are completely immersed in the aqueous solution 104. The aqueous solution 104 preferably is a thoroughly mixed solution in a ratio of approximately ten liters of cold water at approximately 2 to 5° C., 200 grams of salt and 100 grams of baking soda.

The fish product 101 in the basket 105 is completely immersed in the aqueous solution 104 for approximately twenty seconds, after which time it is removed with the basket from the container 103 and the excess aqueous solution 104 is allowed to drain away from the fish. The fish product 101 usually is then patted dry using a porous plastic sponge, or the like, (not shown in the drawings) that has been previously sanitized in alcohol.

Figure 2:
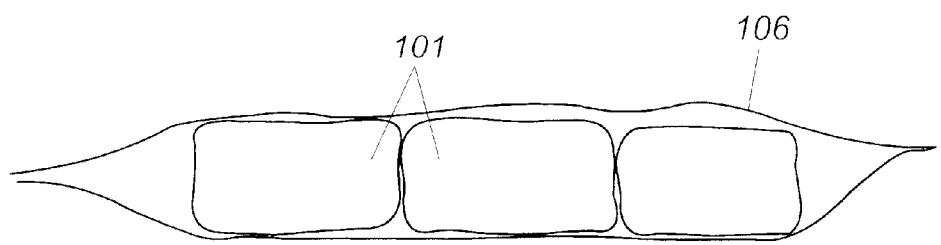
FIGS. 2–4 are schematic elevational views of a vacuum bag and the fish products contained therein, showing the bag in its relaxed, vacuum and inflated configurations, respectively.
Figure 3:
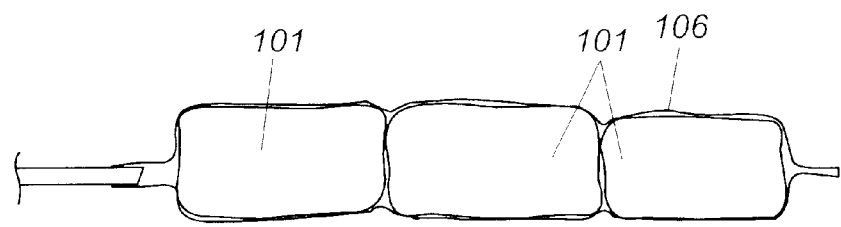

As shown in FIG. 2, the dry fish products 101 are then inserted into a vacuum bag 106 or another type of container in a single layer of the products. It is acceptable for the products to come in contact with each other. As shown in FIG. 3, the vacuum bag 106 or other type of vacuum container is vacuum sealed about the products using a conventional vacuum packaging machine (not shown). The vacuum seal formed about the products should be tight enough to remove substantially all of the air from the container 106, but not so tight as to damage or flatten the fish product.

Figure 4:
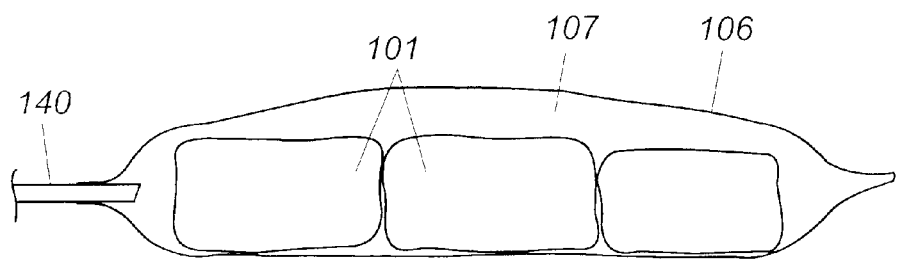

Once the air has been removed from the sealed container 106, the container is filled with filtered smoke 107 as shown in FIG. 4. The container 103 should be filled with smoke until there is a slight pressure on the container. The container should remain sealed, such as with heat sealing of the layers of a plastic bag together, to prevent any of the smoke from exiting the bag 106.

Figure 5:
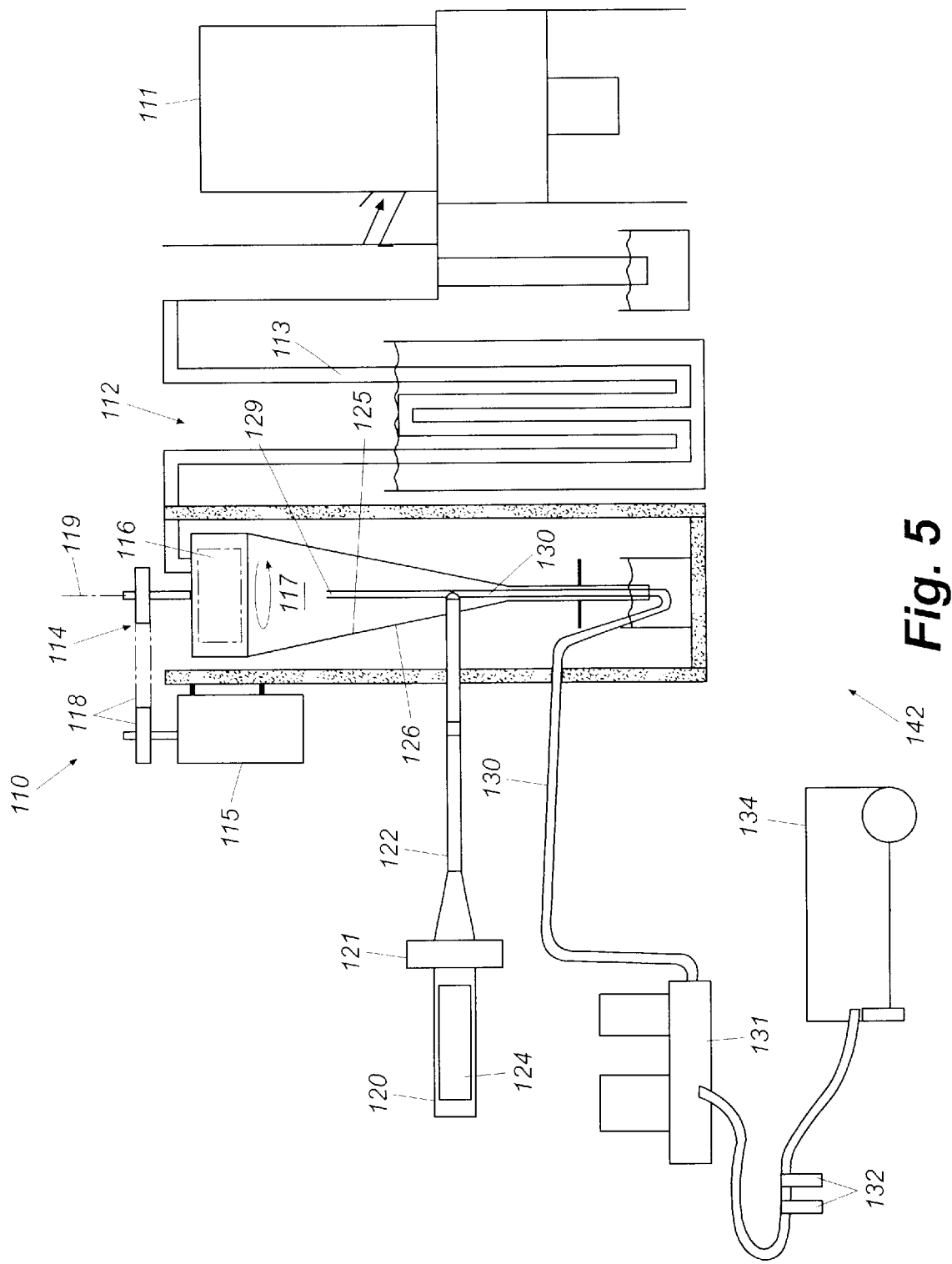
FIG. 5 is a schematic view of the smoke machine.

The smoke can be generated by a smoke machine 110, as shown in FIG. 5. The smoke machine 110 includes a smoke generator 111, a smoke cooler 112, a centrifugal precipitator or centrifuge 114, motor 115, a centrifuge fan 116 and connecting belt and sheaves 118. Motor 115 rotates centrifuge fan through the belt and sheaves in a conventional arrangement. Dirty smoke draw chamber 120 and its suction fan 121 draw the dense or dirty smoke from the centrifuge through mid height exhaust conduit 122, and push the smoke through a filter 124 to the atmosphere. Some of the heavier precipitates of the smoke will move down the converging interior wall 125 of the centrifuge housing 126 through the open bottom to a water trap 128.

The clean smoke is gathered at the vertical axis of the converging conical interior wall of the centrifuge by the inlet opening 129 of the clean smoke exhaust conduit 130. The clean smoke exhaust conduit leads to clean smoke exhaust compressor 131, through filters 132 to smoke storage tank 134.

It would be apparent to one skilled in the art to modify the aforementioned embodiment of the smoke machine 110 by the addition or deletion of certain devices without substantially altering the purpose of supplying a filtered smoke. The smoke generator 111 is of conventional construction and is adapted for the burning of wood or other organic material for the generation of smoke. The smoke is passed from the smoke generator 111 through the smoke cooling conduits 113 of the smoke cooler 112. Cold water is circulated about the smoke cooling conduits to chill the smoke from about 900 degrees F. as it exits the smoke machine to about 400 degrees F. before moving into the centrifuge.

After the smoke has been generated by the smoke generator 111 and passed through the smoke cooler 112, it is passed through the centrifuge 114. The centrifuge 114 removes the majority of the particulate phase, i.e. any particle larger than approximately one micron, of the smoke. The particulate phase, which contains mainly ash and tar, is removed by running the product through the centrifuge 114 (see FIGS. 5 and 6 showing typical centrifuge design and implementation). The centrifuge 114 creates a cyclone effect inside the main chamber 117 by spinning a "squirrel cage" fan blade 116 at a speed of approximately between 3600 and 4000 rpm. The spinning action causes the heavy particulates of the smoke, mainly tar, to be flung by centrifugal force against the inside surface of the perimeter wall 125 of the chamber 126 at high velocity. The heavy particulates then move down the inside wall and funnel down to a collecting receptacle or water trap 128 at the bottom of the conical chamber 126. The collecting receptacle 128 is partially filled with water at the lower open end of the centrifuge 114 so as to trap the heavy smoke particulates being exhausted by the precipitator. With the heavy particulate phase removed, the lighter, cleaner smoke at the center of the vertical axis 119 of the centrifuge 114 enters the outflow pipe and is directed into the smoke storage tank 134.

Excess uncleaned smoke is directed through mid height exhaust conduit 122 and through exhaust suction fan 121. Fan 121 is a variable speed fan that regulates the amount of smoke drawn through the system.

The clean smoke is dispensed on demand from the centrifuge 114 by the compressor 131. The resulting clean smoke exits the centrifuge 114 with a very clear appearance. It is directed by the compressor 131 and its connection hoses through a final filtering device 132 and is collected and maintained in a smoke storage tank 134. When a smoke storage tank is filled with smoke it is refrigerated and stored for later use.

Figure 8:
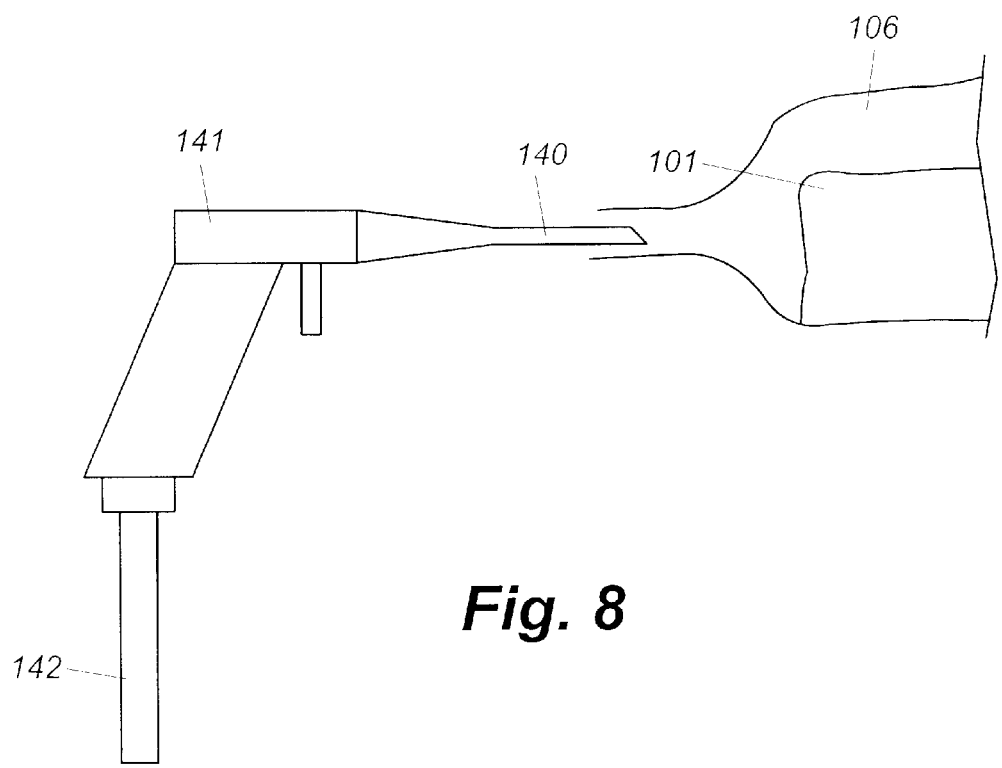
FIG. 8 is a side view of the bag filling device

As illustrated in FIG. 8, the cooled cleaned smoke is later inserted into the vacuum bag 106 with the fish product 101 by placing the hollow needle 140 of an air chuck 141, which is connected to the smoke storage tank 134 via clean smoke dispensing conduit 142, into the bag 106 and pulling the trigger mechanism 144. This opens a valve and allows the clean smoke to move into the vacuum bag 106. For high volume production, the bag 106 can be filled by using a modified atmosphere packaging system like the CVP AT600. If another type of vacuum chamber is used, not a bag, the smoke can be dispensed into the chamber by using a valve controlled conduit.

The filtered smoke will have an initial level of $CO/CO_2$ in the vacuum chamber and the $CO/CO_2$ level should be periodically measured. When the $CO/CO_2$ level begins to decline appreciably, the vacuum chamber is voided of and refilled with smoke until the color characteristics of the fish have stabilized. This procedure should preferably occur at a temperature range of 0 degrees C. to 5 degrees C. and can take anywhere from 1 minute to 72 hours depending on the type of fish product and the characteristics of the smoke and the method of applying the smoke. After this, the smoked fish product is placed in an ozonated environment at a temperature range of about 0 degrees C. to 5 degrees C. and is maintained in the ozonated environment until the odor of smoke is no longer detectable. Depending on the type of fish product and the amount of smoke odor that the product has absorbed during the smoking step, it may take anywhere from 1 minute to 72 hours depending on the type of fish product, the characteristics of the smoke, and the method of applying smoke, for the smoke odor to be sufficiently diminished that it is no longer detectable. The fish product is then removed, vacuum sealed and can be optionally frozen using conventional freezing techniques. When it is desired to use or display the fish product, the fish product is defrosted. The present process for preserving the fish product results in a refreshed fish product that closely parallels a day caught fish in quality, characteristics and appearance.

When the decline of the $CO/CO_2$ level slows appreciably during the smoke application process, the remaining smoke should be removed from the vacuum chamber 106 and replaced with another charge of smoke, as might be necessary. The smoking step should be repeated until the color characteristics of the fish product 101 have stabilized. Depending on the type of fish product 101, the temperature and the smoke characteristics, it may take between approximately twelve to seventy-two hours at atmospheric pressure to satisfactorily complete the smoking step. However, if the smoke is applied in a vacuum chamber at a reduced pressure to the product, the smoke application step can be performed in minutes.

Figure 9:
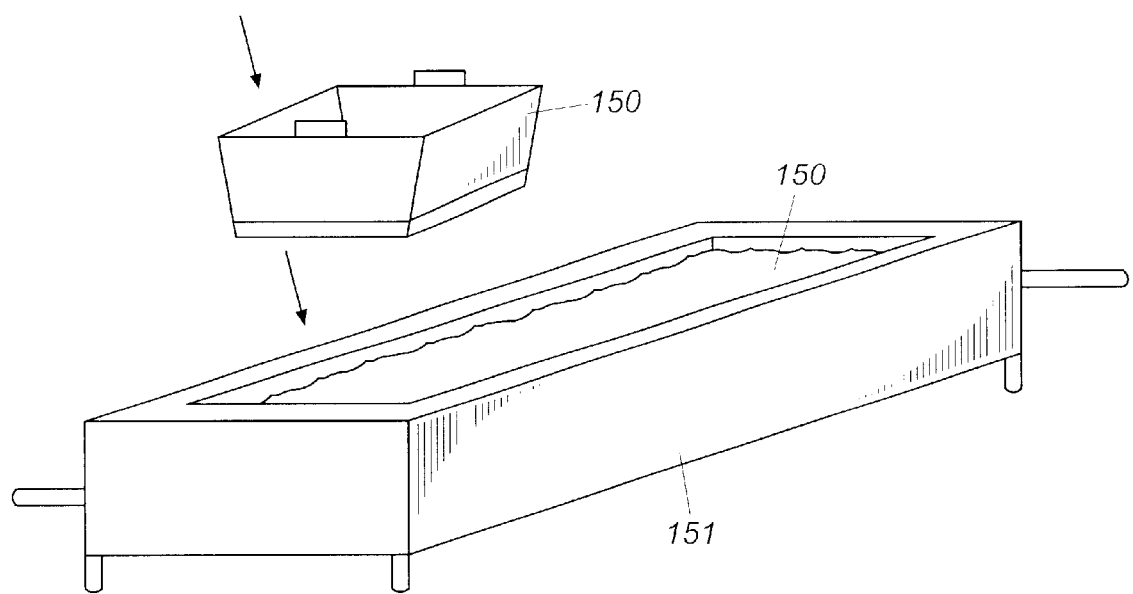
FIG. 9 is a perspective view of the ozone dipping tank and basket.

Once the smoking step is complete, the fish product 101 is removed from the vacuum chamber 106 and may be patted dry using a porous plastic sponge, or the like, sanitized with alcohol. The product is checked for smoke odor. As shown in FIG. 9, the fish product 101 is then placed in a basket 150 or other porous tray device. The fish product 101 may be situated within the basket 150 in either a single or double layer configuration. The basket 150 is then immersed into an ozone dipping tank 151, that contains chilled (at about 5° C.) ozonated water 152 (approximately 2 ppm ozone) for between approximately one minute and one hour. The product can be left in the ozonated water for more than one hour, if desired.

The odor of the fish product 101 is periodically monitored by removing the basket 150 from the ozonated water 152 and sniffing to detect a smoke odor. At the point that the smoke odor is no longer noted, the fish product 101 should be removed from the ozonated water 152 and any excess ozonated water 152 should be allowed to drain away from the basket 150.

The fish product 101 is then placed in a vacuum bag and vacuum sealed. The fish product 101 can be left unfrozen or can be frozen for even longer shelf life, using conventional freezing techniques. If frozen, the fish product 101 should be stored and maintained at temperatures below −18° C.

When the use of the frozen fish product 101 is desired, the product is defrosted while in the bag by either placing the bag in a cooler between 2 and 5° C. or by placing the bag in a basin of cold water. The refreshed fish product 101 will substantially retain the quality and characteristics of a freshly caught fish and may then be displayed or maintained at refrigerated temperatures for up to six more days.

Figure 10:
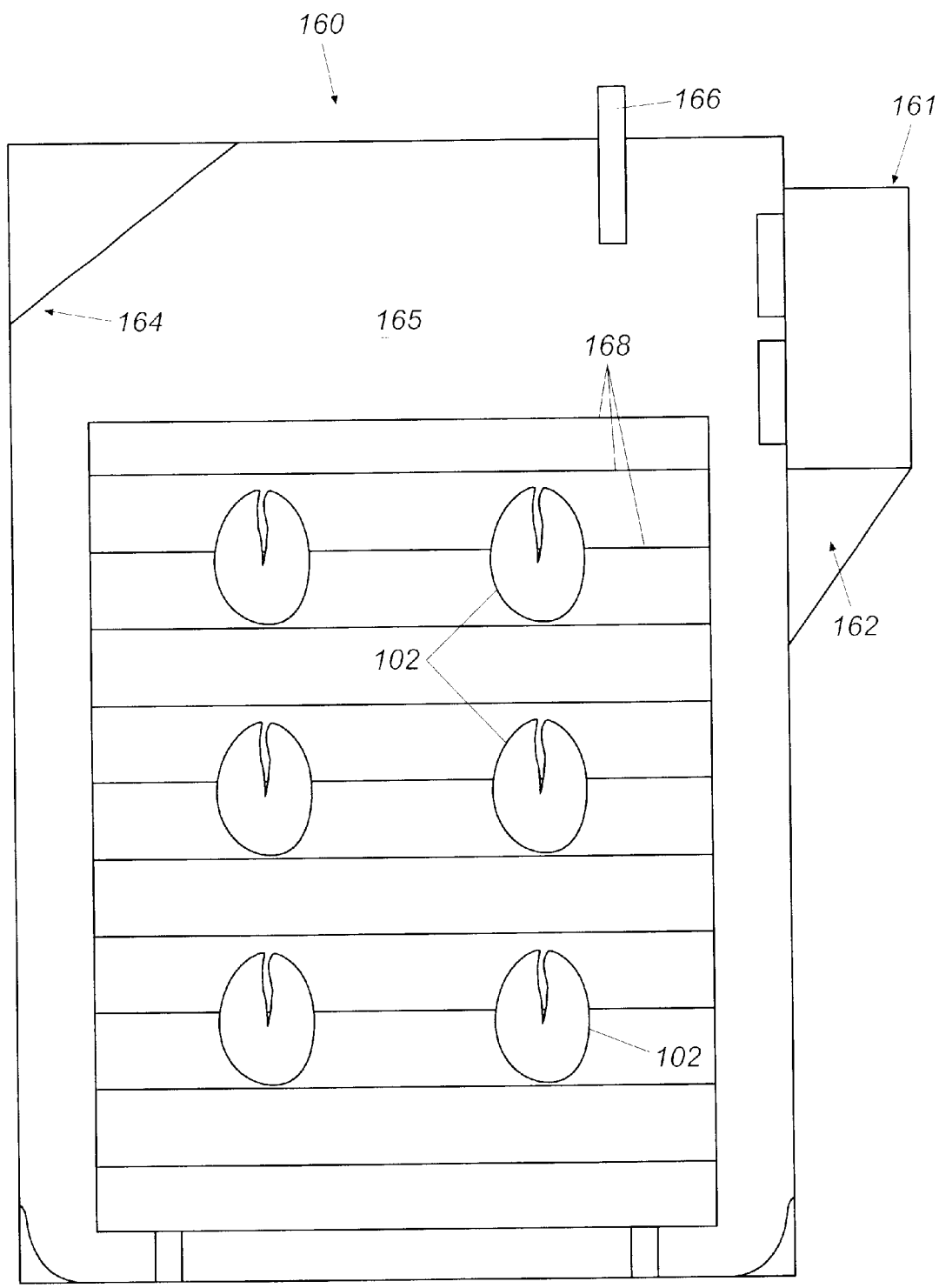
FIG. 10 is a plan view of the ozone chamber used for fish steaks.

If the fish product 101 is tuna, or other pelagic species, the ozone step is applied using a different technique. As shown in FIG. 10, instead of using the ozone dipping tank 151, pelagic fish steaks 102 can be ozonated in an ozone chamber 160 for better results. FIG. 6 illustrates an ozone chamber 160 design comprising an ozone generator 161, intake 162, deflector 164, chamber 165, exhaust 166 and product holding rack 168. After the fish steaks 102 have been smoked and optionally wiped with an alcohol soaked sponge, the fish steaks 102 are placed on racks 168 in the ozone chamber 165. The fish steaks 102 should remain in the ozone chamber 165 for approximately one minute to four hours or until they reach the desired level of smoke odor. Once the fish steaks 102 have been ozonated, they can be placed in a vacuum bag and vacuum sealed. For freezing they are placed in a vacuum bag and are vacuum sealed. For fresh fish, the fish are placed in distribution-ready packages.

As with the fish product 101, when the frozen fish steaks 102 are to be used, the bag is defrosted by either placing the bag in a cooler between 2 and 5° C. or by placing the bag in a basin of cold water. The refreshed fish steaks 102 will retain qualities and characteristics of a fresh caught fish and may then be displayed or maintained at refrigerated temperatures for up to six more days.

Although the aforementioned embodiments are directed to fish products, it is anticipated by the inventors that the claimed preservation process may be applied with equally satisfactory results for fish, beef, pork, poultry and crustaceans. Additionally, the methods for applying the smoke and ozone, and for freezing may be varied from those specifically disclosed herein.

Particularly, it is anticipated by the inventors that the smoke may be applied under atmospheric, vacuum or pressured conditions and in any suitable containment vehicle, including heated or refrigerated conditions. The smoke itself may be comprised of any smoke suitable for treatment of food products for human consumption; may be generated by any number of means including, but not limited to, combustion, transformation between solid or liquid state to gaseous state, friction, pyrolysis, aerobically, anarobically, electrical heating or direct flame; and may be used in its whole or filtered state. If the smoke is filtered to remove any component of the smoke, such filtering may be performed by any physical means, carbon filtering, ice column filtering, centrifugal force, electrostatic force, or other known means of separating out a component of smoke. The smoke may be applied to the products in an open, batch, closed or flow-through system.

Likewise, the ozone treatments disclosed above in the preferred embodiments are not exclusive. The inventors anticipate that the ozone may be applied using any type of carrier medium including, but not limited to, air, gases, water, fluids or solids and under atmospheric, vacuum or pressured environments and in any suitable containment vehicle, including heated or refrigerated conditions. The ozone that is applied is not limited to "pure" ozone, but may be in reaction form, mixtures, solutions or other form. The ozone may be applied to the products in an open, batch, closed or flow-through system.

The freezing step of the preservation process may be accomplished using any number of conventional freezing applications. Particularly, it is anticipated by the Applicants that suitable freezing can occur under atmospheric, vacuum and pressured conditions in gaseous, liquid or solid freezing mediums or combinations thereof.

While the process described herein involves the treatment of fresh fish, a similar process can be applied to frozen fish. One such process is to thaw the frozen fish and later apply the smoke and ozone to the fish. A preferred process of treating frozen fish is to simultaneously thaw and smoke the fish in a chamber. This can be done in a vacuum chamber. This eliminates the exposure of the fish to standard atmosphere as it thaws.

It should be emphasized that the above-described embodiments of the present invention, particularly, any "preferred" embodiments, are merely possible examples of implementations, merely set forth for a clear understanding of the principles of the invention. Variations and modifications may be made to the above-described embodiments of the invention without departing from the spirit and principles of the invention. All such modifications and variations are intended to be included herein within the scope of this disclosure and the present invention and protected by the following claims.

Therefore, having thus described the invention, at least the following is claimed:

1. A process for treating raw fish products for increasing the shelf life of the fish products and preserving the color and freshness of the fish products after the fish products have been frozen and thawed, comprising the steps of:
   subjecting the raw fish products to smoke to apply smoke to the fish products for a period sufficient to preserve and substantially maintain the color of the flesh and blood line of the fish products;
   a removing the smoke from about the smoked raw fish products;
   subjecting the smoked raw fish products to ozone to apply ozone to the smoked fish products for a period sufficient for the ozone to substantially remove smoke odor from the fish products and sufficient to reduce the existing bacteria on the fish products; and
   after the steps of applying smoke and ozone to the raw fish products freezing the raw fish products for storage and shipment,
   so that the combination of the smoking and ozone applications is sufficient such that when the smoked and ozone treated raw fish products are thawed, the color of the fish products is substantially maintained and the shelf life of the thawed fish is extended compared to fish that have been similarly treat with smoke, frozen and thawed without the ozone application.

2. The process of claim 1, further including the step of before the fish products are subjected to smoke and ozone cutting the fish products into portions that are of a size that the smoke applied to the fish products will permeate into and substantially through the fish products.

3. The process of claim 1, wherein the step of subjecting the fish products to smoke comprises subjecting the fish products to smoke for a sufficient period of time such that the smoke permeates the fish products and serves as a preservative of the fish products.

4. The process of claim 1, and further including the additional step of freezing the fish products before the fish products are subjected to smoke and ozone, and wherein the step of subjecting the fish products to smoke comprises simultaneously thawing the fish products and applying smoke to the fish products.

5. The process of claim 1, wherein the step of subjecting the fish products to smoke comprises cleaning the smoke by removing a portion of the particulate in the smoke prior to applying the smoke to the fish products.

6. The process of claim 1, wherein the step of subjecting the fish products to smoke comprises placing the fish products in a container, reducing the pressure in the container to a pressure less than atmospheric pressure, and introducing smoke into the container when the pressure in the container is less than atmospheric pressure.

7. The process of claim 6, and further including the step of, before the step of subjecting the fish products to smoke, cleaning the smoke by removing a portion of the particulate in the smoke before the fish products are subjected to the smoke.

8. The process of claim 1, wherein the step of subjecting the fish products to smoke comprises burning organic matter to form smoke, cleaning the smoke, chilling the smoke, and subjecting the fish products to the chilled and cleaned smoke at a pressure other than atmospheric pressure.

9. The process of claim 1, wherein the step of subjecting the smoked fish products to ozone comprises subjecting the fish products to ozone through a carrier medium.

10. The process of claim 9, wherein the ozone is applied to the flab products in a containment chamber.

11. The process of claim 1, wherein each of the steps of subjecting the fish products to smoke and ozone comprises reducing the atmosphere about the fish products to a pressure less than atmospheric pressure and introducing the smoke and ozone to the fish products in the reduced pressure atmosphere.

12. A process for treating raw fish for increasing the shelf life of the raw fish and preserving the color and freshness of the raw fish after the raw fish have been treated, frozen and thawed, comprising:
   a) forming raw fish into fish products of a predetermined size;
   b) placing the fish products into a chamber;

c) withdrawing air from about the fish products in the chamber;
d) generating smoke from an organic substance;
e) removing the heavier particles from the smoke to create cleaned smoke;
f) introducing the cleaned smoke into the chamber and applying the cleaned to smoke to the fish products in the chamber;
g) containing the cleaned smoke within the chamber with the fish products for a predetermined period sufficient for the smoke to permeate into and substantially through the raw fish products, and to substantially maintain the color of the fish products;
h) withdrawing the cleaned smoke from the chamber while the fish products remain in the chamber;
i) introducing ozone into the chamber and applying the ozone to the smoked fish products in the chamber;
j) containing the ozone within the chamber with the fish products for a period sufficient to reduce the existing bacteria on the fish products and to substantially remove the aroma and taste of smoke from the fish products;
k) withdrawing the ozone from the chamber; and
l) freezing the smoked, ozone treated raw fish products, so that the combination of smoking and ozone treatments of the raw fish products is sufficient such that when fish products are thawed, the thawed fish products have substantially retained their color from the time prior to having been smoked and the shelf life of the thawed fish products is extended compared to other similarly smoked, frozen and thawed fish without the ozone application.

13. The process of claim 12, and further including repeating steps f and h before performing step i.

14. The process of claim 13, and further including the step of repeating steps i, j, and k.

15. The process of claim 12, wherein the step of withdrawing air from about the fish products in the chamber comprises forming a pressure less than atmospheric pressure in the chamber.

16. The process of claim 12, wherein the step of containing the cleaned smoke within the chamber comprises placing the fish products in a vacuum bag.

17. The process of claim 12, wherein the step of containing the cleaned smoke within the chamber comprises containing the cleaned smoke within the chamber and about the fish products for a sufficient time to apply enough cleaned smoke to the fish products so that the cleaned smoke on the fish products deters deterioration of the fish products.

18. The process of claim 17, further including the step of monitoring the $CO/CO_2$ levels of the cleaned smoke residing within the chamber, and wherein the step of containing the cleaned smoke within the chamber with the fish products comprises containing the cleaned smoke in the chamber until an appreciable decline is noted in the $CO/CO_2$ levels.

19. The process of claim 17, wherein the steps of introducing cleaned smoke into the chamber and containing the cleaned smoke in the chamber and about the fish products comprises removing the cleaned smoke from the chamber and introducing more cleaned smoke into the chamber and about the fish products until the color characteristics of the fish products in the chamber have stabilized.

20. The process of claim 12, wherein the step of introducing the ozone into the chamber comprises introducing the ozone into the chamber as a liquid solution containing ozone.

21. The process of claim 12, wherein the step of introducing the ozone into the chamber comprises introducing the ozone into the chamber as a gas or gaseous mixture containing ozone.

22. The process of claim 12, wherein the steps of introducing and containing the ozone in the chamber comprises containing the ozone within the chamber and about the fish products for a sufficient time to apply enough ozone to the fish products so that odor and taste of smoke in the fish products are no longer detectable.

23. The process of claim 12, wherein the step of freezing the fish products comprises freezing the fish products after the steps of ozonation and removal of the fish products from the chamber.

24. The process of claim 12, wherein the step of freezing the fish products comprises freezing the fish products after the steps of smoking, ozonation and removal of the fish products from the chamber.

25. The process of claim 12, further including the additional step of freezing the fish products before the steps of placing the fish products into the chamber and prior to the steps of smoking and ozonating the fish products.

26. A process of treating raw fish products for increasing the shelf life of the fish products and preserving the color and freshness of the fish products at a time alter the fish products have been frozen and thawed, comprising the application of smoke to the raw fish products for a period sufficient to preserve and substantially maintain the color of the raw fish products, followed by the application of ozone to the fish products for a period sufficient to substantially remove the aroma and taste of smoke from the fish products and to reduce the existing bacteria on the fish products, freezing of the raw, smoked and ozone treated fish products, maintaining the frozen fish products in a frozen state until use is desired, and thawing the fish products, so that the combination of smoking, ozone treatment and freezing of the raw fish products is sufficient such that when the fish products are thawed, the thawed fish products have substantially retained their appearance from the time prior to having been smoked and the shelf life of the thawed fish products is extended compared to other similarly smoked, frozen and thawed fish products without the ozone treatment.

27. A process for preserving fish products as in claim 26, wherein the applications of smoke and ozone preserve the fish products by substantially preventing or inhibiting the growth of bacteria on the surface of and in the flesh of the fish products.

28. A process for preserving fish products as in claim 27, further comprising the additional step of freezing the fish products before the application of smoke and ozone.

29. A process for treating raw fish products for preserving the color and freshness of the fish products and for increasing the shelf life of said fish products after the fish products have been frozen and thawed, comprising:

(a) placing a raw fish product in a vacuum bag;
(b) subjecting the fish product to smoke in the vacuum bag until the exposure of the fish product to the smoke substantially stabilizes the color characteristics of the fish product;
(c) removing the smoke from about the fish product;
(d) treating the raw fish product wit ozone for a period sufficient to substantially remove the aroma and taste of smoke from the fish products and sufficient to reduce the existing bacteria on the fish product; and (e) freezing the raw, smoked and ozone treated fish product for storage and shipment, so that the combination of smoking and ozone treatment of the raw fish product is sufficient such tat when the fish product is frozen and later thawed the fish thawed fish product substantially retains its appearance from prior to having been smoked and the shelf life of the thawed fish product is increased compared to other fish that were similarly smoked, frozen and thawed without ozone treatment.

30. The process of claim 29 and further comprising the step of monitoring the decline of CO/CO2 levels in the smoke in the vacuum bag until the decline slows, at which point removing any remaining smoke from the vacuum bag.

31. The process of claim 30 and further comprising the steps of continuing to subject the fish products to smoke and removing the smoke from around the fish products.

32. The process of claim 29 wherein the fish products comprise laterally compressed fish products, the step of treating the fish products with ozone is performed by immersion of the fish products in an ozone dipping tank for a sufficient period of time to remove any detectable smoke odor or taste from the fish products.

33. The process of claim 29, wherein the fish products comprise pelagic fish products, the step of treating the fish products with ozone is performed by immersion of the fish products in an ozone chamber for a sufficient period of time to remove any detectable smoke odor or taste from the fish products.

34. The process of claim 29, wherein the fish products comprise laterally compressed fish products, the fish products are frozen at a temperature below −35° C., stored at a temperature below −18° C. and maintained at a refrigeration temperature between approximately 2 and 5° C.

35. The process of claim 29, wherein the fish products comprise pelagic fish products, the fish products are frozen at a temperature below −40° C., stored at a temperature below −18° C. and are thawed and maintained at a refrigeration temperature between approximately 2 and 5° C.

36. A process of treating raw fish products for increasing the shelf life of the fish products and preserving the color of the fish products after the fish products have been frozen and thawed, comprising the steps of:

applying smoke to a raw fish product for a period sufficient to preserve the fish product and sufficient to substantially maintain the color of the blood line of the fish product;

after the smoke has been applied to the fish product, applying ozone to the smoked raw fish product for a period sufficient to substantially remove the aroma and flavor of smoke from the fish product and sufficient reduce the existing bacteria on the fish product; and freezing the raw, smoked and ozone treated fish product for storage and shipment, so that the combination of smoking, ozone treatment and freezing of the raw fish product is sufficient such that when the frozen fish product is thawed the fish product substantially retains its appearance from prior to having been smoked and the shelf life of the thawed fish product is increased compared to other fish that were similarly smoked, frozen and thawed without the application of ozone to the fish.

37. A process of preserving the color and freshness of previously smoked raw fish and increasing the shelf life of the smoked raw fish after the fish has been frozen and thawed comprising:

treating previously smoked raw fish with ozone for a time sufficient to substantially remove the smoke aroma and flavor from the fish and sufficient to reduce the existing bacteria on the fish , and freezing the smoked, ozone treated raw fish, so that when the frozen fish is thawed the fish substantially retains its appearance from prior to having been smoked and the shelf life of the thawed fish is increased compared to other fish that were similarly smoked, frozen and thawed without the ozone treatment.

\* \* \* \* \*